F. E. DONHAM & W. H. FISHER.
DEMOUNTABLE RIM.
APPLICATION FILED DEC. 20, 1913.
1,137,708.
Patented Apr. 27, 1915.
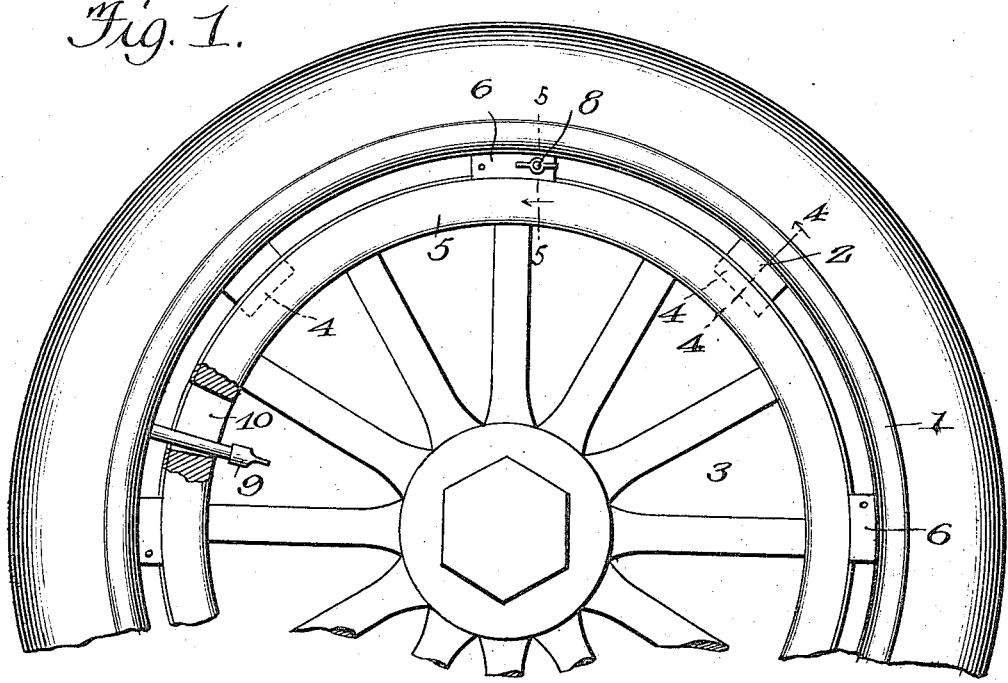
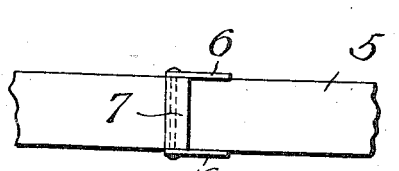
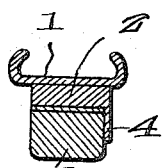
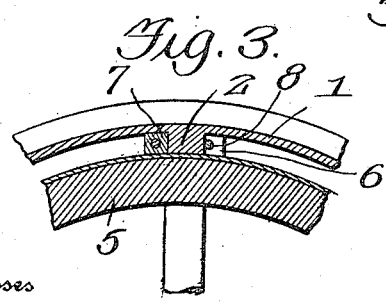
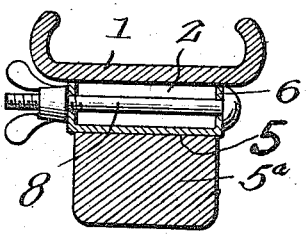
Witnesses
Hugh H. Hett
V. B. Hillyard.
Inventors
F. E. Donham &
W. H. Fisher.
By Victor J. Evans
Attorney

UNITED STATES PATENT OFFICE.

FREDERICK E. DONHAM AND WILLIAM H. FISHER, OF TACOMA, WASHINGTON.

DEMOUNTABLE RIM.

1,137,708.  Specification of Letters Patent.  Patented Apr. 27, 1915.

Application filed December 20, 1913. Serial No. 807,977.

*To all whom it may concern:*

Be it known that we, FREDERICK E. DONHAM and WILLIAM H. FISHER, citizens of the United States, residing at Tacoma, in the county of Pierce and State of Washington, have invented new and useful Improvements in Demountable Rims, of which the following is a specification.

This invention has relation to vehicle wheels and more particularly to such as are designed for automobiles, the purpose being to provide for the quick and easy replacement of a pneumatic tire when the same becomes necessary by puncture, blow out or other cause resulting in deflation of the tire.

The invention provides novel interlocking means between the detachable rim and the main rim of the wheel so as to prevent possible displacement of the outer rim when the parts are assembled and at the same time insuring ample supporting means between the two rims for sustaining the load.

The invention consists of the novel features, details of construction and combination of parts, which hereinafter will be more particularly set forth, illustrated in the accompanying drawings, and pointed out in the appended claim.

Referring to the drawings forming a part of the specification, Figure 1 is a side view of a vehicle wheel embodying the invention. Fig. 2 is a plan view of a portion of the main rim of the wheel showing the socket for receiving the lug upon the inner side of the detachable rim. Fig. 3 is a sectional view of a portion of the two rims showing the lug of the outer rim secured in the socket of the inner rim. Fig. 4 is an enlarged cross section on the line 4—4 of Fig. 1. Fig. 5 is an enlarged cross section on the line 5—5 of Fig. 1.

Corresponding and like parts are referred to in the following description, and indicated in all the views of the drawings, by the same reference characters.

The numeral 1 designates a detachable rim which may be of any construction but which in the form shown is of the variety designed for clencher tire, said rim being provided at intervals upon its inner side with lugs 2 which are adapted to engage the outer side of the main rim of the wheel 3 so as to sustain the load and also provide locking means. The lugs 2 may be formed as a part of the rim 1 or may be riveted or otherwise attached thereto. Certain lugs are provided at one side with flanges 4 which are adapted to engage a side of the rim 5 and felly 5ᵃ to properly position the rim 1 when placing the latter upon the wheel. The flanges 4 act as stops to limit the movement of the rim 1 when slipping the same upon the rim 5.

The rim 5 may be of any form or construction and is provided at intervals with sockets to receive certain lugs 2 which in conjunction with such sockets constitute the locking means between the two rims when the demountable rim 1 is in position. The sockets comprise side elements 6 and cross elements 7. The side elements 6 are formed as a part of the rim 5 and constitute lips. The elements 7 consist of short bars which are placed between end portions of opposed elements or lips 6 and are firmly secured in place. When the demountable rim is in position certain lugs 2 enter certain sockets and each of such lugs engages the side elements 6 and cross elements 7 of a socket thereby limiting the movement of the rim 1 in one direction and retaining it in place against any lateral movement or play. To prevent movement of the rim 1 in the opposite direction a key 8 closes the open side of a socket and is retained in place by engaging projecting ends of the side elements or lips 6. When placing the rim 1 in position or removing it from the wheel the lugs 2 are caused to enter or leave the sockets by a relative circular movement of the rim 1. The flanges 4 properly position the rim 1 to cause the lugs 2 to enter the sockets by giving a circular movement to the rim 1 after the latter has been placed upon the rim 5. In order that the valve stem 9 may not interfere with the rotary movement of the demountable rim 1, the rim 5 and felly 5ᵃ are each formed with a slot 10 which extends in the circumferential length of the rim 5. When placing the demountable rim in position the valve stem 9 is first passed through the slot 10 after which the rim 1 is pressed upon the rim 5 and is given a partial turn to cause the lugs 2 to enter the sockets, the rim being made secure by means of the key 8 in the manner stated.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claim appended hereto.

Having thus described the invention what we claim as new, is:—

In a vehicle wheel, the combination of a felly, a fixed rim having transversely alined lips projecting outward from its edges at intervals, cross bars placed against the rim and between corresponding ends of the lips and secured thereto, a demountable rim formed with lugs certain ones of which come between the lips and engage the fixed rim and said cross bars and the remaining lugs having stop lugs at one edge to limit the movement of the demountable rim when placing it in position, and means for retaining the demountable rim in place, the same consisting of a key supported in the opposite ends of a pair of lips and engaging the lug received between such lips.

In testimony whereof we affix our signatures in presence of two witnesses.

FREDERICK E. DONHAM.
WILLIAM H. FISHER.

Witnesses:
G. M. FISHER,
M. ERICKSON.

Copies of this patent may be obtained for five cents each, by addressing the "Commissioner of Patents, Washington, D. C."